United States Patent [19]

Carroll et al.

[11] 3,972,020
[45] July 27, 1976

[54] TRANSFORMERLESS INPUT FOR SEISMIC DATA ACQUISITION SYSTEM

[75] Inventors: Paul E. Carroll; Warren Moore, Jr.; William C. Voigt, all of Houston, Tex.

[73] Assignee: Texas Instruments Incorporated, Dallas, Tex.

[22] Filed: Dec. 11, 1974

[21] Appl. No.: 531,563

[52] U.S. Cl. .................. 340/15.5 AF; 340/3 M; 340/15.5 GC; 340/15.5 F; 330/30 D; 178/63 E
[51] Int. Cl.² .................... G01V 1/36; H04B 3/28
[58] Field of Search ......... 340/3 A, 3 M, 15.5 GC, 340/15.5 AF, 15.5 F, 15.5 TS; 178/63 B, 63 E; 330/30 D, 149; 179/79

[56] References Cited
UNITED STATES PATENTS

| | | |
|---|---|---|
| 2,733,412 | 1/1956 | Alexander et al. ........... 340/15.5 GC |
| 2,748,202 | 5/1956 | McCallister et al. ................. 333/12 |
| 3,223,920 | 12/1965 | Sasaki .................................. 333/12 |
| 3,535,646 | 10/1970 | Quinn .................................. 333/12 |
| 3,705,365 | 12/1972 | Szabo et al. ........................... 333/12 |
| 3,778,759 | 12/1973 | Carroll .......................... 340/15.5 F |

*Primary Examiner*—Nelson Moskowitz
*Attorney, Agent, or Firm*—Hal Levine; Rene E. Grossman; Leo N. Heiting

[57] ABSTRACT

In a long line data acquisition system, an input network is provided for coupling the lines to a data acquisition unit. The network includes the cascade combination of a first filter presenting a low pass frequency response to common mode voltage and a second filter presenting a low pass frequency response to difference mode voltage. The output of the second filter is coupled to an amplifier having high common mode rejection. The network substantially reduces, at the amplifier input, both common mode and difference mode noise picked up by the lines.

9 Claims, 4 Drawing Figures

TRANSFORMERLESS INPUT FOR SEISMIC DATA ACQUISITION SYSTEM

This invention relates to data acquisition systems and in particular to a multi-channel seismic data acquisition system.

In various data acquisition systems one or more signal producing receivers may be located in an area remote from a central data acquisition unit. In a seismic prospecting system, for example, a plurality of geophones or geophone groups are located over an area or along a line on the surface of the earth. A central data acquisition unit or recording system is located in a truck at a point remote from the geophones. The data acquisition unit is coupled to the various geophones by means of a cable which includes a pair of wires corresponding to each geophone or geophone group. The cable may typically have a length of several miles and will, in general, carry relatively weak signals ranging in amplitude from a few millivolts to less than a microvolt. The low level signals are frequently corrupted by noise picked up in the geophones, the cable, and in the data acquisition system itself.

One significant noise source is power line pickup, generally induced into the cable electrostatically as a common mode signal. Some of this noise is converted to difference mode noise by capacitive and resistive unbalance in the geophones, cable and recording system amplifiers. Power sources may also be picked up in the geophones magnetically as a difference mode signal and also as a common mode signal due to power line currents flowing in the earth.

Thunderstorms are also a major source of common mode noise induced in the cable. This type of pickup occurs whenever the cable is subjected to either the electrostatic, the magnetic or the electromagnetic field of a thunderstorm. Electrostatic field strength decays rapidly with distance from the center of the storm while the magnetic field strength decays less rapidly with distance. The electromagnetic field strength, however, decays even less rapidly and may prove to be a problem even at a distance of several hundred kilometers.

The thunderstorm induced noise picked up by the cable may typically have an amplitude of 10 volts peak. Some of this noise is changed from common mode to difference mode by the unbalanced capacities and leakage to ground in the cable. In view of the typical signal amplitudes carried by the cable, this noise pickup presents a serious problem in data recovery.

At the present time, the most common method for resolving this problem involves the use of an input transformer for coupling each of the pairs of wires in the cable to the data acquisition unit. The transformer has the desirable feature of providing good common mode rejection. The problem with this method is that each transformer must be very large to minimize low frequency distortion and low frequency phase errors while still having low enough winding resistances to not add appreciably to the noise. Other problems include the decrease in common mode rejection capability of transformers with increasing frequency. Additionally, transformers are sensitive to external magnetic fields, mechanical vibrations and shock and can become magnetized and deteriorate the signal. The input capacity of the transformer can rarely be balanced thus causing common mode to difference mode conversion.

Another method in common use involves the use of two inverting operational amplifiers with about a 500 ohm input resistor in each. The output of the first amplifier is coupled through a resistor to the summing junction of the second amplifier and the gains are proportioned such that the equivalent signals applied to the two inputs of the combination with respect to ground give signals of equal magnitude but opposite phase at the output of the second amplifier. In other words, the combination has common mode rejection. With the 500 ohm input resistors in each amplifier this combination has a difference mode input impedance of 1,000 ohms and common mode input impedance of 250 ohms. This low difference mode input impedance causes a large loading of the source and cable and results in consequent signal loss. Increase in the values of the input resistors so as to increase the difference mode input impedance results in unacceptable increase in the thermal noise level of the resistors.

The input system of the present invention provides a solution to the problem in a manner which is compatible with the peculiar requirements of seismic data systems. Such systems typically must operate with ungrounded geophones and employ lengthy multi-pair unshielded cables. A DC return to ground or some other reference potential must be provided in the input system. The input impedance to the system should be relatively high, constant, balanced and should not cause low frequency phase shifts.

In the preferred embodiment of the invention the pair of wire lines leading to a geophone is coupled to a common mode filter. The filter has a low pass frequency response to common mode signals and a substantially flat frequency response to difference mode signals. Its output is coupled to a difference mode filter having a low pass response to difference mode signals and a substantially flat response to common mode signals. The output of the difference mode filter is coupled to an amplifier network having high common mode rejection. The amplifier network provides a single ended output for coupling into the data acquisition unit. It is an object of the invention to provide an input network which is largely insensitive to atmospherically induced noise in a data acquisition system.

It is a further object of the invention to provide an input network which substantially rejects common mode noise as well as difference mode noise which lies outside a signal bandwidth while at the same time preserving data in small signals.

Other objects and features of the invention will become obvious through a consideration of the following detailed description in connection with the attached drawings wherein.

Figure 1:
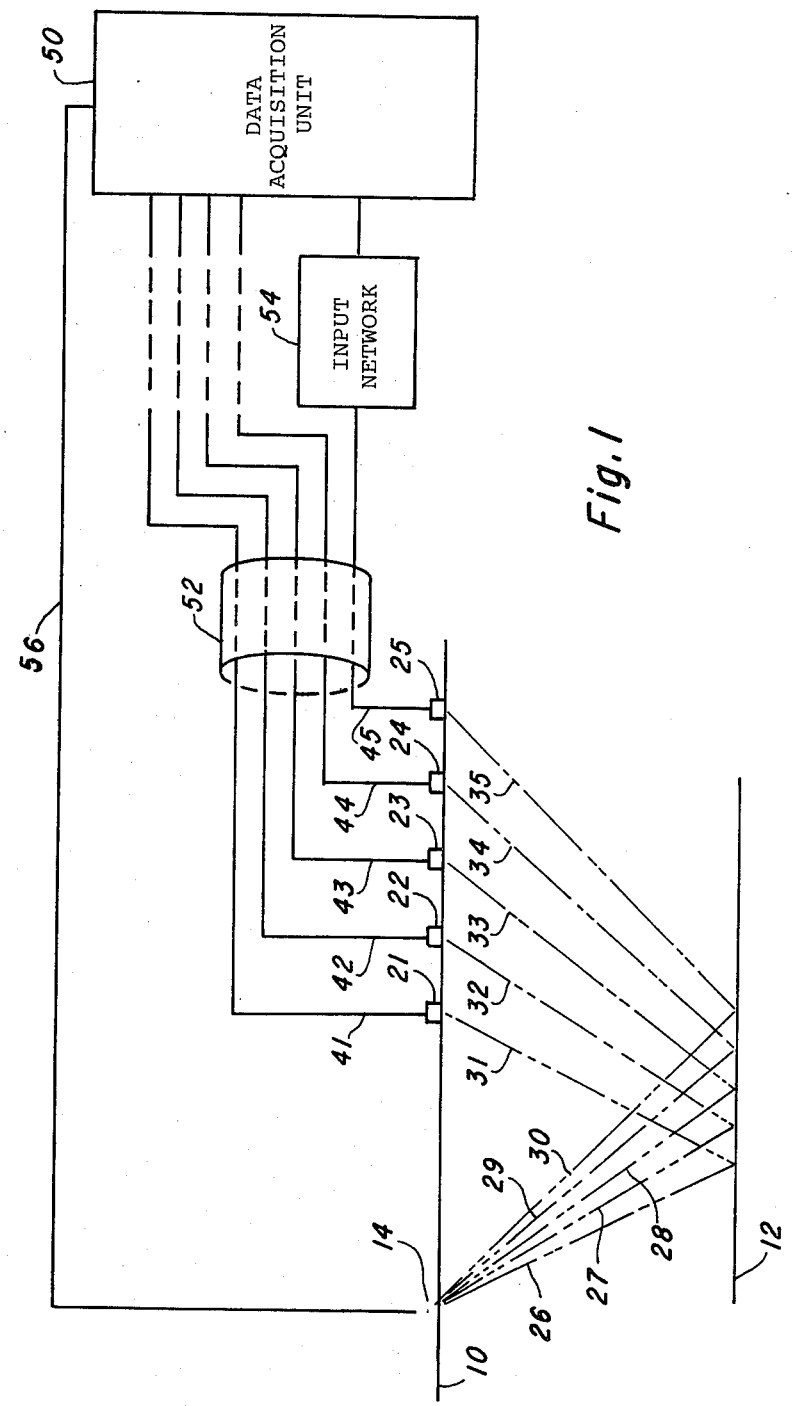
FIG. 1 is a diagram of a seismic data acquisition system including the input network of the invention.

In FIG. 1 there is shown in diagramatic form a typical seismic prospecting arrangement but modified to include the input network of the present invention. A segment of the surface of the earth is represented by line 10. A seismic source for inducing acoustic waves in the elastic material of the earth is shown at 14. Source 14 may constitute, inter alia, a chemical explosion or, as is very common in the art, an apparatus for exerting harmonic forces on the surface of the earth. One typical such apparatus is the Vibroseis* source. * Trademark of Continental Oil Company Acoustic waves from source 14 will propagate in a generally isotropic manner into the crustal layers of the earth. One specific ray path for the acoustic waves is indicated by reference designator 26. Line 12 is representative of a discontinuity in the acoustic impedance of the earth material. When acoustic waves propagating along ray path 26 encounter discontinuity 12, at least a portion of the propagating energy is reflected and propagates thereafter in a generally upward direction. This reflected wave propagating along ray path 31 is ultimately sensed by seismic receiver 21 and converted to an electrical signal. As is well known in the art, seismic receiver 21 may comprise either a geophone or a closely located plurality of geophones electrically connected to provide a single electrical output signal. The usual connection is some series-parallel combination, the specific connection being unimportant here. Other acoustic waves emmanating from source 14 propagate along downward directed ray paths 27 through 30 and the corresponding upward directed ray paths 32 through 35 for ultimate detection by seismic receivers 22 through 25. While only five seismic receivers are shown in FIG. 1, it is common in the art to utilize many more in connection with a single seismic source, 48 being a typical number. It will be appreciated from the foregoing that the electrical signals produced by the seismic receivers contain valuable information regarding the subsurface structure of the earth.

These electrical signals are coupled by lines 41 through 45 to a central data acquisition unit where the signals are preprocessed, collated and recorded for use in subsequent more detailed processing. It is common for the data acquisition unit 50 to be located in a truck which is positioned at some distance from the seismic receivers.

Physically, each of lines 41 through 45 will comprise an unshielded twisted pair of wires for coupling the differential outputs of the various seismic receivers back to data acquisition unit 50. Typically, the plurality of twisted pairs is bound together in a single cable bundle and protected by an external jacket 52. The length of the cable bundle is substantial, sometimes exceeding one mile. The long, unshielded twisted pairs of wires are extremely vulnerable to noise pick up from surrounding fields. The amplitudes of these noise components typically are far in excess of the signal amplitudes produced by seismic detectors 21 through 25. In accordance with the principles of the present invention an input network 54 is shown inserted in line 45 at the point where line 45 enters data acquisition unit 50. Input network 54, as will be explained henceforth, substantially reduces common mode noise appearing on line 45 and also functions as a low pass filter to differential signals appearing on line 45. While not shown explicitly in FIG. 1, it will be understood that there will be a similar input network in each of the other seismic receiver output lines such as lines 41 through 44. As indicated schematically by line 56, it is common in the art for seismic source 14 to function under the control of data acquisition unit 50.

Figure 2:
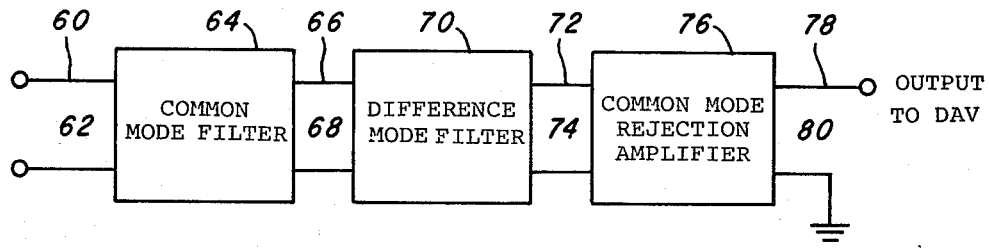
FIG. 2 is a block diagram of the preferred embodiment of the invention.

FIG. 2 is a block diagram of the preferred embodiment of input network 54. The differential input from the cable is coupled by lines 60 and 62 to a common mode filter 64. The differential output of common mode filter 64 is coupled by lines 66 and 68 to a difference mode filter 70. Difference mode filter 70 also has a differential output which is coupled by lines 72 and 74 to common mode rejection amplifier 76. In the preferred embodiment, amplifier 76 has a single ended output referenced to ground by line 80 and coupled by line 78 to the data acquisition unit.

While amplifier 76 has a high common mode rejection ratio, its common mode rejection capability alone is not sufficient to meet system requirements. In particular, the common mode rejection capability of amplifier 76 degrades at high frequency. This is compensated by common mode filter 64 which presents a low pass frequency response to common mode signals. The frequency response of filter 64 to difference mode signals, however, is substantially flat within the frequency range of interest. As a result, common mode filter 64 does not distort the difference mode seismic signals.

As noted previously, atmospherically induced noise enters the system primarily as a common mode signal. As a result of imbalances in the system, however, there occurs some common mode to difference mode conversion with the result that the signal appearing on lines 60 and 62 may have a substantial difference mode noise component. Difference mode filter 70 is designed with a low pass response to difference mode signals so as to reject that portion of the difference mode noise lying outside the signal passband.

Figure 3:
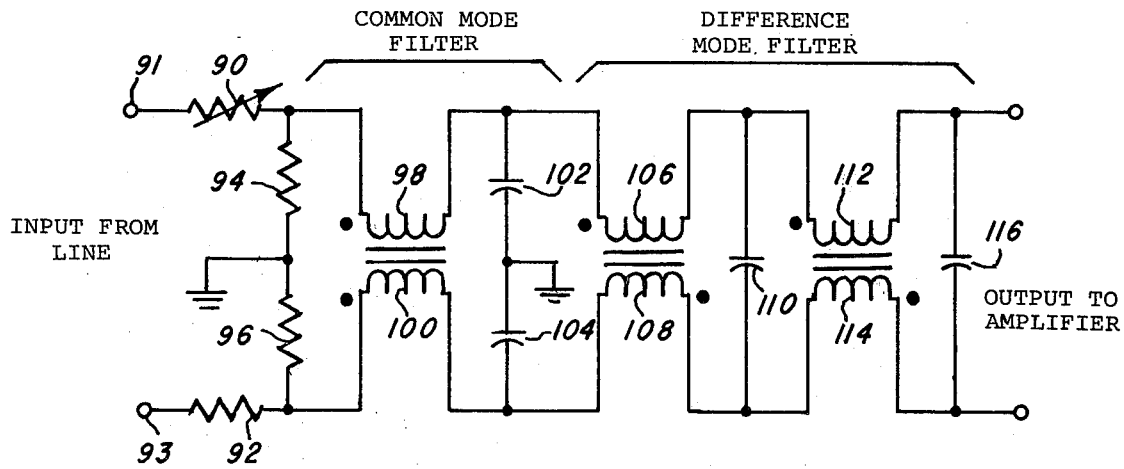
FIG. 3 is a schematic diagram illustrating the common mode and difference mode filters of the input network.

A schematic diagram showing the common mode filter and difference mode filter of the preferred embodiment appears in FIG. 3. Here the differential input is coupled from the cable by means of lines 91 and 93. Resistors 94 and 96 are coupled in series between the differential signal path and, with their common junction coupled to ground, provide the input DC return path. The value of resistors 90 and 92 is small in comparison with that of resistors 94 and 96. Resistors 90 and 92 are used to compensate for any imbalance that may occur in resistors 94 and 96.

The output of the resistive circuit is coupled to the common mode filter. The common mode filter used in the preferred embodiment is very similar to that disclosed and claimed in U. S. Pat. No. 3,778,759 granted to Paul E. Carroll and assigned to the assignee of the present invention. On the upper side of the differential signal path in FIG. 3 the filter comprises inductor 98 connected in series with the signal path and capacitor 102 shunting the signal path to ground. Similarly, on the lower side of the differential signal path the filter comprises inductor 100 in series with the signal path and capacitor 104 shunting the signal path to ground. It will be recognized by those skilled in the art that the filter comprises a single LC low pass filter section on each side of the differential signal path. It will be noted, however, that inductors 98 and 100 are magnetically coupled. In accordance with a well known convention, the sense of the mutual coupling is indicated in FIG. 3 by the positions of the dots relative to the two inductors. In the case of the common mode filter the dots are both on the input sides of inductors 98 and 100. For the purpose of this application, this type of arrangement will be referred to as direct mutual coupling.

In the preferred embodiment, inductors 98 and 100 are bifilar wound on the same core thereby resulting in very tight coupling between the windings. Inductors 98 and 100 are wound to have the same value of inductance L and under the conditions of tight coupling it may be assumed that the mutual inductance M is equal to L.

The frequency response of the filter to common mode input signals will be low pass in nature either with or without the mutual coupling between inductors 98 and 100. However, as explained in U. S. Pat. No. 3,778,759, in view of the assumed perfect coupling between these inductors, the inductors 98 and 100 cancel each other as to any difference mode signal thereby eliminating difference mode filtering. It should be noted that in filters of this type it is sometimes desirable to place resistors in parallel with capacitors 102 and 104. Proper selection of these resistors governs the Q of the resultant low pass filter. In the preferred embodiment, however, such resistors are not required, the Q of the filter being controlled by proper selection of the winding resistances and core losses of inductors 98 and 100.

As seen in FIG. 3 the differential output of the common mode filter is coupled directly into the difference mode filter. In the preferred embodiment, the difference mode filter comprises two identical LC filter sections connected in cascade relationship.

The first section comprises windings 106 and 108 each connected in series with an opposite side of the differential signal path at the output of the filter section. The windings 106 and 108 are wound on the same core 107. The combination of the windings and the core may be thought of as comprising a single inductor which happens to have its winding split in the middle. The advantage of the split inductor is the symmetry of the arrangement with respect to stray capacitance to ground so that there is less conversion of the residual common mode voltage to difference mode. Also, the winding capacitance, particularly the capacitance from winding to core, is more advantageously distributed than would be the case for a single winding. The LC filter section comprised of the capacitor 110 and the aforementioned inductor comprised of windings 106, 108, and core 107 functions as a low pass filter to difference mode signals. Windings 106 and 108 are mutually coupled but, in accordance with the dot convention, it is seen that the sense of the coupling in this case is opposite to that of the coupling between the windings of the common mode filter. This will be referred to as reverse mutual coupling. Common mode signals do not encounter any inductive reactance in the inductor because the windings 106 and 108 will cancel each other. In the case of a common mode signal, the inductive reactances of windings 106 and 108 effectively cancel each other thereby eliminating common mode filtering and thus the conversion of any remaining common mode signal to difference mode in the section. In the preferred embodiment, the second section of the difference mode filter is comprised of windings 112 and 114 each in series with an opposite side of the differential signal path, core 113, and capacitor 116 shunting the differential output of the section. The two LC sections in cascade serve to provide a low pass frequency response to difference mode signals.

The following are preferred values for the various components shown in FIG. 3.

| | |
|---|---|
| Resistor 90 | 0–20 ohms |
| Resistor 92 | 10 ohms |
| Resistors 94 and 96 | 10 K |
| Inductors 98 and 100 | 6 henries |
| Capacitors 102 and 104 | 0.01 microfarads |

-continued

| | |
|---|---|
| Capacitors 110 and 116 | 0.015 microfarads |

The total inductance in the first section of the difference mode filter is equal to $L_{106} + L_{108} + 2M_{106,108}$ where $L_{106}$ and $L_{108}$ are the self inductances of windings 106 and 108 respectively and $M_{106,108}$ is the mutual inductance between these windings. In the preferred embodiment this total inductance has a value of 0.5 henries in each section of the difference mode filter.

Figure 4:
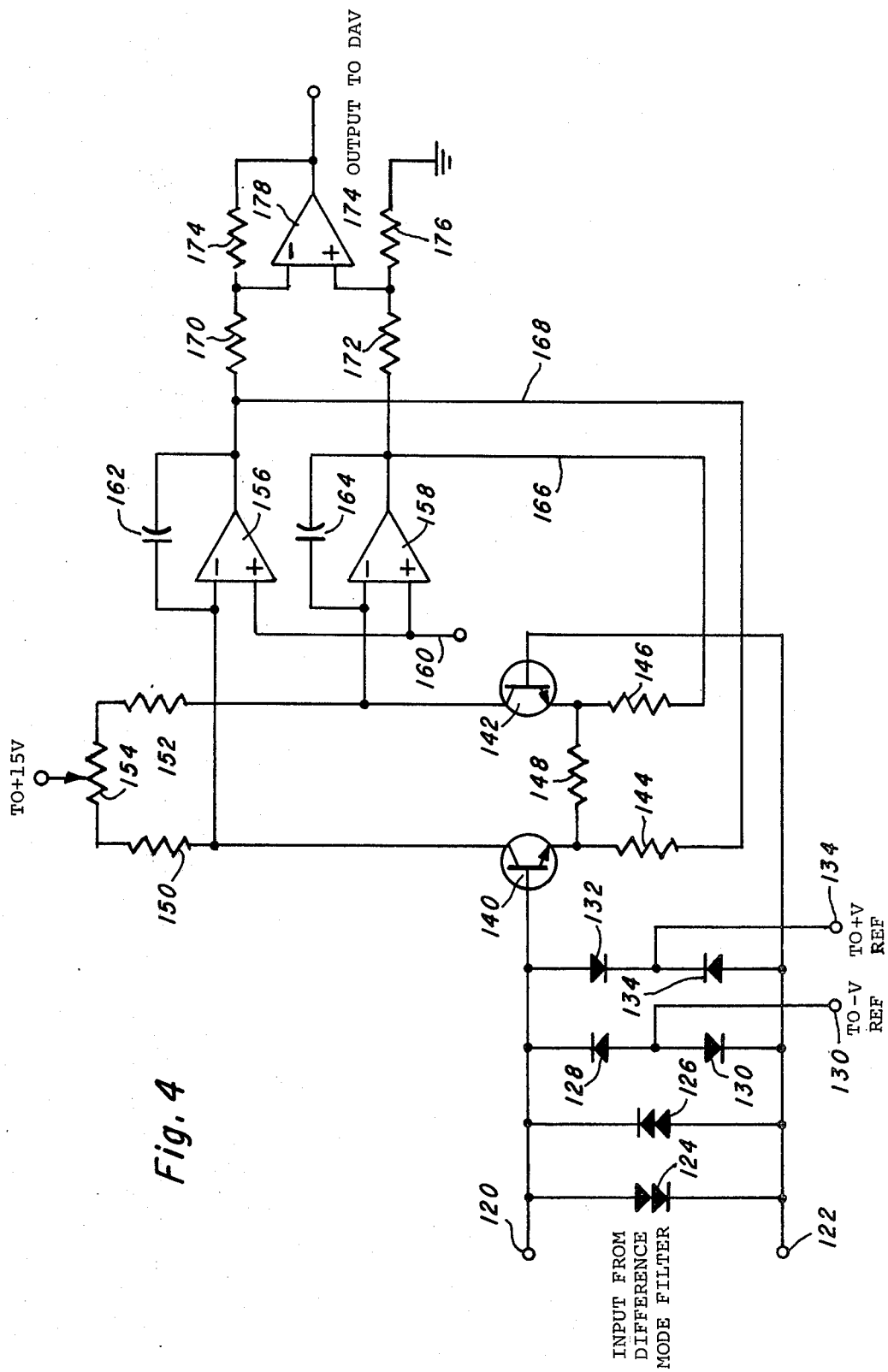
FIG. 4 is a schematic diagram of the amplifier section of the input network.

Amplifier 76 of FIG. 2 is shown in schematic form in FIG. 4. Lines 120 and 122 which carry the differential input to the amplifier will be coupled to the differential output of the difference mode filter in FIG. 3. The differential input signal is coupled directly to the bases of transistors 140 and 142 which, together with their associated resistive networks and DC amplifiers 156 and 158, comprise a differential input stage to the amplifier. Diodes 124 and 126, coupled across the differential input line, protect the transistors from excessively large difference mode signals. Similarly, diodes 128, 130, 132 and 134 coupled between the input lines and referenced to plus and minus reference potentials as shown protect the transistors from excessively large common mode signal levels. In the preferred embodiment the plus and minus voltage references utilized here each have an amplitude of six volts.

Transistors 140 and 142 are a matched pair of low noise transistors. The collector of transistor 140 is coupled through load resistor 150 and potentiometer 154 to a +15 volt supply. Similarly, the collector of transistor 142 is coupled through load resistor 152 and potentiometer 154 to the +15 volt supply. The collectors of transistors 140 and 142 drive the inverting inputs of amplifiers 156 and 158, respectively. While amplifiers 156 and 158 in the preferred embodiment comprise operational amplifiers, it is only required in the practice of the invention that these amplifiers be inverting, high-gain, DC coupled amplifiers. If, as in the preferred embodiment, they are operational amplifiers, the positive and negative power supply terminals are connected to +15 and −15 volts, respectively, and the non-inverting inputs of both amplifiers are returned to a +10 volt reference as shown in FIG. 4.

The output of amplifier 156 is coupled by line 168 to one end of feedback resistor 144, the other end of which is coupled to the emitter of transistor 140. Similarly, the output of amplifier 158 is coupled by line 166 to one end of resistor 146, the other end being coupled to the emitter of transistor 142. Resistor 148, which is connected between the emitters of transistors 140 and 142, serves in conjunction with resistors 144 and 146 to set the difference mode gain of the input stage. Thus, if we designate resistor 144 as R1, resistor 146 as R2 and resistor 148 as R3, the difference mode gain from the bases of transistors 140 and 142 to the outputs of amplifiers 156 and 158 is:

$$A_{DM1} = \frac{R1+R2+R3}{R3} \qquad (1)$$

The common mode gain of this portion of the amplifier is unity. Thus, the common mode rejection ratio of this portion of the amplifier is the difference mode gain $A_{DM1}$. $A_{DM1}$ should be as high as the signal level permits to obtain the maximum common mode rejection ratio.

Capacitors 162 and 164 each have relatively small capacitance values and function to prevent high frequency oscillations in the amplifiers.

The differential output from amplifiers 156 and 158 is operated on by a final amplifier stage to provide additional common mode rejection and to provide a single ended rather than a differential output signal to the data acquisition unit. The output of amplifier 156 is coupled through resistor 170 to the inverting input of operational amplifier 178, also powered from + and − 15 volts. Feedback from the output of amplifier 178 back to the inverting input is provided by resistor 174. The output of amplifier 158 is coupled through resistor 172 to the non-inverting input of amplifier 178. The This is also coupled through resistor 176 to ground. The ratio of the resistance of resistor 170 to that of resistor 174 is selected equal to the ratio of the resistance of resistor 172 to that of resistor 176. Under these circumstances if we designate resistor 170 as R4 and resistor 174 as R5 it will be recognized by those skilled in the art that the difference mode gain of the final amplifier stage is:

$$A_{DM2} = R_5/R_4 \qquad 2.$$

In the ideal case, the common mode gain of the last stage is zero. Practically, the common mode gain depends upon the resistor match and on the common mode rejection in amplifier 178 itself. A typical common mode rejection ratio for this last amplifier stage may be 60 db at low frequencies.

Any DC offset appearing at the output of amplifier 178 may be set to sero by proper adjustment of potentiometer 154.

The amplifier components as shown in FIG. 4 may have the following values or type numbers.

| | |
|---|---|
| Diodes 124 and 126 | MPD200 |
| Diodes 128, 130, 132 and 134 | IN914B |
| Transistors 140 and 142 | 2N2639 |
| Resistors 144 and 146 | 3.32K |
| Resistor 148 | 499 ohms |
| Resistor 150 & 152 | 90.9K |
| Potentiometer 154 | 20K |
| Amplifiers 156, 158, and 178 | LM312H |
| Capacitors 162 and 164 | 47pf |
| Resistors 170 and 172 | 5K |
| Resistors 174 and 176 | 7K |

There has been disclosed a unique input network for a long line seismic data acquisition system. While the preferred embodiment of the invention has been shown, other embodiments consistent with the principles of the invention may suggest themselves to those skilled in the art. Also, while the invention has been disclosed in connection with a seismic data acquisition system, it will be clear to those skilled in the art that the input network may be used to advantage in other similar types of data acquisition systems.

What is claimed is:

1. In a data acquisition system having at least one transducer and wherein the signal produced by each of said transducers is coupled by a separate pair of wire lines to a data acquisition unit, the combination between each of said transducers and said data acquisition unit comprising:
    a. filter means including a common mode filter and a difference mode filter,
        i. said common mode filter further comprising at least one common mode filter section with differential input and output, said filter section having a first pair of magnetically coupled inductors each connected between an input and an output of the section and a pair of capacitors connected in series between the outputs of the section with means for coupling the node between said pair of capacitors to a common reference potential,
        ii. said difference mode filter further comprising at least one difference mode filter section with differential input and output and having a second pair of inductors each connected between an input and an output of the section with a capacitor connected between the output terminals of the section,
        iii. the pair of inductors of each common mode filter section being bifilar would to have direct mutual coupling and the pair of inductors of each difference mode filter section being wound to have reverse mutual coupling, and
    b. amplifier means having high common mode rejection.

2. The system of claim 1 further comprising diode network means at the input of said amplifier for protecting said amplifier means from excessive common mode and difference mode signal levels.

3. In a data acquisition system having at least one transducer and wherein the signal produced by each of said transducers is coupled by a separate pair of wire lines to a data acquisition unit, the combination between each of said transducers and said data acquisition unit comprising:
    a. filter means including a common mode filter and a difference mode filter,
        i. said common mode filter further comprising at least one common mode filter section with differential input and output, said filter section having a first pair of magnetically coupled inductors each connected between an input and an output of the section and a pair of capacitors connected in series between the outputs of the section with means for coupling the node between said pair of capacitors to a common reference potential,
        ii. said difference mode filter further comprising at least one difference mode filter section with differential input and output and having a second pair of inductors each connected between an input and an output of the section with a capacitor connected between the output terminals of the section, and
    b. amplifier means having high common mode rejection and further comprising:
        i. a differential input stage,
        ii. a pair of amplifiers each with an inverting input terminal coupled to one of the outputs of said differential input stage,
        iii. feedback means for coupling the outputs of said pair of amplifiers to said differential input stage, and
        iv. an operational amplifier responsive to the outputs of said pair of amplifiers for providing a single ended output signal.

4. In a data acquisition system having at least one transducer and wherein the signal produced by each of said transducers is coupled by a separate pair of wire lines to a data acquisition unit, the combination between each of said transducers and said data acquisition unit comprising:
  a. filter means for suppressing both common mode and difference mode signals, and
  b. amplifier means having high common mode rejection, said amplifier means further comprising:
     i. an input stage having differential input and output,
     ii. a pair of inverting amplifiers with inputs coupled to opposite sides of said differential output,
     iii. a feedback network coupling the outputs of said pair of amplifiers to said input stage, and
     iv. an output stage with differential input coupled to the outputs of said pair of amplifiers.

5. A system for coupling a plurality of pairs of wire lines to a data acquisition unit, each of said pairs leading to a transducer, said system comprising in cascade relationship between each of said pairs of wire lines and said data acquisition unit:
  a. first filter means with a low pass frequency response to common mode signals and a substantially flat frequency response to difference mode signals,
  b. second filter means with a low pass frequency response to difference mode signals and a substantially flat frequency response to common mode signals, said first and second filter means comprising a composite filter unit, and
  c. amplifier means operatively coupled to the output of said filter unit, and having high common mode rejection, said amplifier means further comprising:
     i. a differential input stage having a differential output,
     ii. a pair of inverting amplifiers, each responsive to a different side of said differential output,
     iii. a feedback network operatively connected between the outputs of said pair of inverting amplifiers and said differential input stage, and
     iv. an operational amplifier operatively coupled to the outputs of said pair of inverting amplifiers and having a single ended output.

6. A network for coupling a data channel comprising a pair of wire lines to a data acquisition unit, said network comprising:
  a. filter means for suppressing both common mode and difference mode signals, and further comprising:
     i. a first filter having a low pass frequency response to common mode signals and a substantially flat response to difference mode signals, and
     ii. a second filter having a low pass frequency response to difference mode signals, and
  b. amplifier means having high common mode rejection and further comprising:
     i. an input stage with differential input and output,
     ii. an output amplifier having a differential input,
     iii. a pair of inverting amplifiers with inputs coupled to opposite sides of said differential output the signals produced by said inverting amplifier being coupled to said output amplifier, and
     iv. feedback means coupling the outputs of said inverting amplifiers to said input stage.

7. The network of claim 6 wherein said first filter has a differential input coupled to said pair of wire lines and comprises a pair of magnetically coupled inductors each connected between one of said wire lines and one side of the differential output of the filter, a pair of capacitors connected in series between the two sides of said differential output, and means for connecting the node between said capacitors to a reference potential.

8. A network for coupling a data channel comprising a pair of wire lines to a data acquisition unit, said network comprising:
  a. filter means for suppressing both common mode and difference mode signals, and further comprising:
     i. a first filter having a low pass frequency response to common mode signals and a substantially flat response to difference mode signals, and
     ii. a second filter having a low pass frequency response to difference mode signals and a substantially flat response to common mode signals, said second filter having at least one stage, each of said stages comprising a pair of inductors connecting the differential input and output of the stage and magnetically coupled in reverse relationship, and a capacitor connected between the two sides of said differential output,
  b. amplifier means having high common mode rejection, and
  c. diode protection means at the differential input of said amplifier means.

9. In a data acquisition system having at least one transducer and wherein the signal produced by each of said transducers is coupled by a separate pair of wire lines to a data acquisition unit, the combination between each of said transducers and said data acquisition unit comprising:
  a. filter means including a common mode filter and a difference mode filter, said difference mode filter further comprising at least one difference mode filter section with differential input and output and having a pair of inductors each connected between an input and an output of the section with a capacitor connected between the output terminals of the section, the pair of inductors of each difference mode filter section being bifilar wound to have reverse mutual coupling, and
  b. amplifier means having high common mode rejection.

* * * * *